Nov. 29, 1960  W. E. FOLKERTS  2,962,331
SEALING DEVICE
Filed Oct. 9, 1959
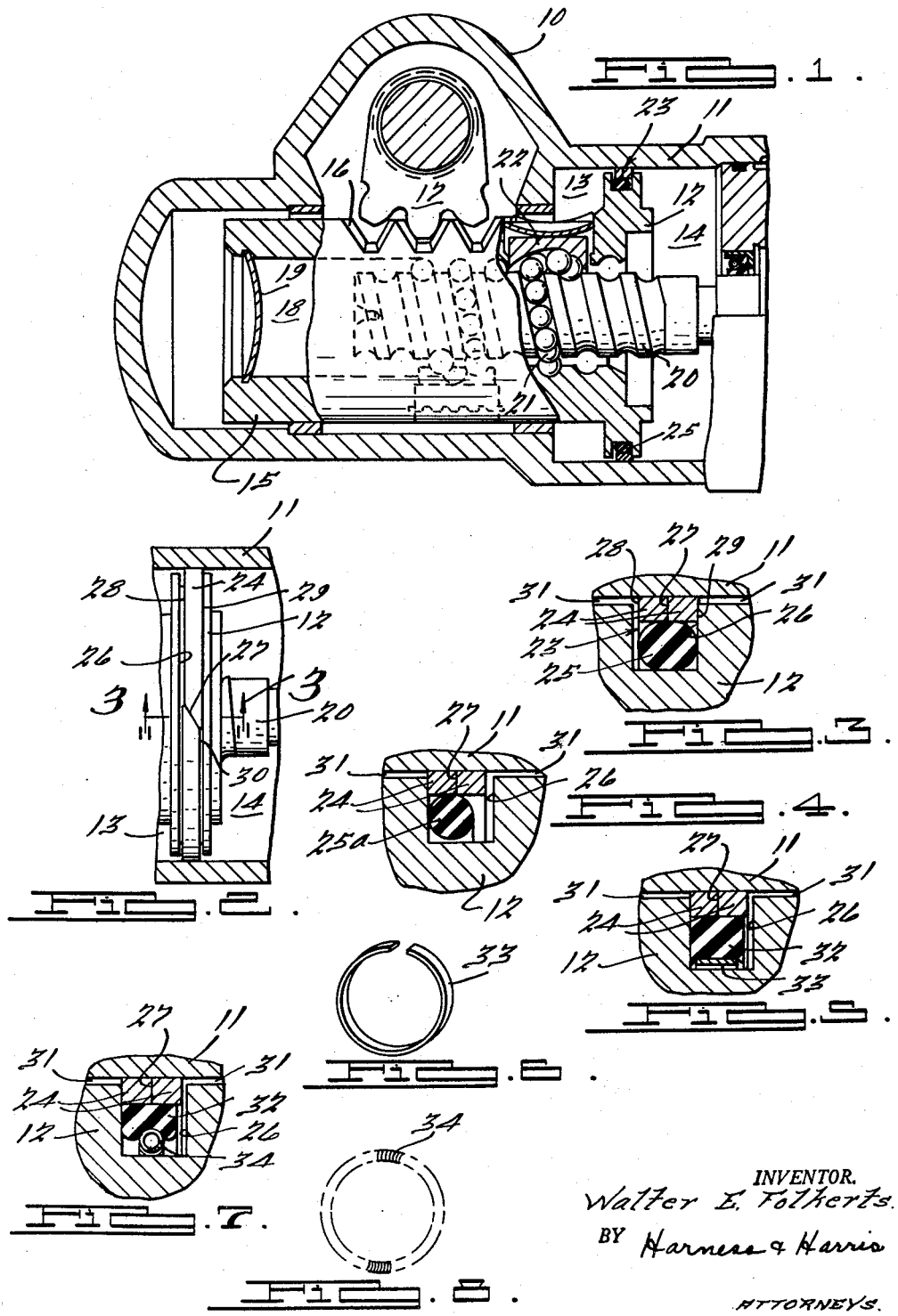
INVENTOR.
Walter E. Folkerts.
BY Harness & Harris
ATTORNEYS.

United States Patent Office 2,962,331
Patented Nov. 29, 1960

2,962,331

SEALING DEVICE

Walter E. Folkerts, Hazel Park, Mich., assignor to Chrysler Corporation, Highland Park, Mich., a corporation of Delaware Filed Oct. 9, 1959, Ser. No. 845,352

6 Claims. (Cl. 309—29)

This invention relates to improvements in a sealing device particularly suitable to provide an effective seal for a piston reciprocable within a cylinder, as for example in a hydraulically actuated automotive power steering gear. It will be apparent from the following that the improved sealing device can be suitable used in many other applications. This application is a continuation-in-part of my copending application Serial No. 725,068, filed March 31, 1958.

In a conventional type of seal for a hydraulically actuated piston, a split or broken piston ring having side-by-side lapping ends is contained within a circumferential groove in the piston. A ring of rubber-like material is also disposed within the groove under compression between the piston ring and the base of the groove so as to urge the piston ring into sealing engagement with the inner wall of the cylinder and also to complete seals with both the base of the groove and the inner circumference of the piston ring. By virtue of such a structure, a sliding sealing engagement between the piston ring and cylinder wall is achieved. However, unless the dimensional tolerances of the lapping ends of the piston ring are maintained within extremely close limits which are impractical from a cost standpoint with conventional mass production methods of manufacture, leakage of fluid across the piston at the region of the lapping edges occurs and is particularly objectionable in such applications as power steering where a predetermined and positively dependable high pressure differential across the piston is essential.

An important object of the present invention is to provide an improved sealing structure of the foregoing character wherein leakage of fluid across the seal at the lapping ends of the piston ring is effectively minimized even during comparatively high pressure operation.

Another object is to provide such a device which is particularly simple in structure and subject to economical manufacture by mass production methods and which avoids the usual problems of maintaining precise production tolerances.

Another and more specific object is to provide an improved piston ring type of seal wherein the juxtaposed ends of the ring are tapered so as to cam each other axially when the ring is compressed or expanded radially. The piston ring is fitted in a cylinder of slightly smaller inside diameter than the outside diameter of the ring, so that the ring is compressed in its assembled condition and the sides of the ring at its opposite ends are cammed out of alignment with each other by the cam action of the tapered ends. The ring also fits partially within an annular groove in the outer periphery of a piston and is yieldingly urged radially outwardly into fluid sealing engagement with the cylinder wall by ring means including a deformable inner ring of rubber-like material.

In accordance with the foregoing structure, fluid pressure at the high pressure side of the piston enters said annular groove and forces the two rings axially against the low pressure side of the groove. The inner rubber-like ring is forced into fluid sealing engagement with the low pressure side of the groove and the inner periphery of the first-named or outer ring, thereby to provide an annular fluid seal between the outer ring and the low pressure side of the groove. The greater the fluid pressure acting on the ring, the more effective will be the seal. Also, the fluid pressure acting on the high pressure side of the outer split ring forces the latter's overlapping tapered ends together into fluid sealing engagement with each other, thereby to effect an unbroken annular seal around the piston, which seal increases in effectiveness with an increasing pressure differential across the piston.

Still another object is to provide a seal of the above character wherein the radially outward pressure of the inner rubber-like ring against the outer split ring is augmented by a third or innermost ring concentrically engaging the inner periphery of the rubber-like ring. The third or innermost ring is resiliently expansible so as to urge the rubber-like ring forcibly against the inner periphery of the outer split ring, thereby to force the latter into sealing engagement with the inner wall of the cylinder.

By virtue of such a structure, the characteristics of the rubber-like ring can be determined so as to effect an optimum seal between the outer split ring and its retaining groove in the piston, without regard to the force exerting ability of the rubber-like ring tending to urge the split ring radially against the cylinder. In consequence the range of suitable material for the rubber-like ring is greatly increased and optimum sealing efficiency is obtained with minimum cost.

Other objects of this invention will appear in the following description and appended claims, reference being had to the accompanying drawings forming a part of this specification wherein like reference characters designate corresponding parts in the several views.

Figure 1 is a fragmentary longitudinal sectional view through the piston and worm shaft of an automotive power steering gear, illustrating a seal embodying the present invention.

Figure 2 is a fragmentary view similar to Figure 1, showing the piston and ring seal in elevation.

Figure 3 is a fragmentary enlarged view similar to Figure 1, showing details of the seal along the section line 3—3 of Figure 2.

Figure 4 is a view similar to Figure 3, but showing a modified form of the seal when the latter is subject to an oppositely directed pressure differential from that of Figure 3.

Figure 5 is a view similar to Figure 3 showing another modification of the seal.

Figure 6 is an isometric view of the force exerting ring shown in Figure 5.

Figure 7 is a fragmentary view similar to Figure 3 showing still another modification of the seal.

Figure 8 is an isometric view of the force exerting ring shown in Figure 7.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring in more particularity to Figures 1–3, an application of the present invention in a power steering gear is illustrated wherein a housing 10 for fluid contains a cylindrical portion 11. A piston 12 reciprocable in the cylindrical portion 11 and coaxial therewith partitions the latter into chambers 13 and 14 which are suitably connected by valve means, not shown, with a pressure source for maintaining a pressure differential between the chambers 13 and 14, thereby to drive piston 12 to the left or right in a steering action. Integral with the piston 12 is a hollow extension 15 closed at its left end by plate 19. The upper edge of the extension 15 comprises an integral toothed gear rack 16 meshed with a sector gear 17 which in turn is operatively coupled with the dirigible wheels of the vehicle. A worm 20 suitably mounted within the housing 10 is coupled with a steering wheel for manual actuation and is also in driving engagement with the extension 15 by means of a ball-nut type connection which may be conventional.

In the present instance the hollow interior 18 of extension 15 is provided with grooves mating with the grooves of the worm 20 to carry two sets of balls 21, each set of balls comprising a portion of a single helical turn of the mating grooves. Associated with each set or partial helix of balls 21 is a crossover port member 22 secured within the extension 15 and providing a path over the crests of the worm to enable endless recirculation of the balls 21 upon rotation of worm 20.

In accordance with the operation of the structure described thus far, upon application of pressure to one or the other of the chambers 13, 14, piston 12 is driven in one direction or the other so as to rock sector gear 17 and thereby effect a power boost to the manual steering force.

In order to assure positive power steering action by means of piston 12, a seal 23 is provided between the piston 12 and cylinder 11. As illustrated in Figures 2 and 3, the seal 23 comprises a split or broken piston ring 24 of comparatively hard resilient material, such as steel or cast iron, and an annular ring 25 of resiliently deformable rubber-like material of a type which will not react with the hydraulic fluid. The rubber-like ring 25 is confined with an annular groove 26 formed in the outer periphery of the piston 12 and can be of circular or rectangular section. The radial walls of the groove 26 extend normally to and circularly around the axis of the piston 12.

The cross sectional diameter of the ring 25 is determined so that the latter is compressed between the base of the groove 26 and the inner circumference of ring 24 when the latter is assembled within the cylinder 11. In the assembled position, the compressed rubber-like ring 25 effects fluid sealing engagement with both the base of the groove 26 and the inner circumference of the piston ring 24 and also urges the outer periphery of the ring 24 into sliding fluid sealing engagement with the inner circumference of the cylinder 11. In this latter regard, the engaged surfaces of the ring 24 and cylinder 11 are finished to effectuate such a seal.

The opposite ends of the broken piston ring 24 are formed axially on a bias of approximately 30°, Figure 2, so as to abut each other along a plane 27 containing a radius of the cylinder 11 and making an acute angle of approximately 30° with the axis of the cylinder 11. Except for its bias formed ends, the ring 24 has parallel sides and is of uniform rectangular cross section. The ring 24 normally tends to assume a circular unstressed shape with its left and right sides 28 and 29 parallel to the sides of the groove 26 when the piston 12 is not confined within cylinder 11. The outer circumference of the ring 24 in its circular unstressed condition is slightly greater than the inner circumference of cylinder 11, so that when the assembled piston 12 and ring 24 are confined within the cylinder 11, the ring 24 is compressed between the cylinder 11 and sealing ring 25 to a radius smaller than its unstressed radius. Thus the abutting tapered ends of the ring 24 slide circumferentially with respect to each other along the plane 27 and are cammed axially to the position illustrated in Figure 2, whereat the ring assumes a helical shape. In consequence, when fluid pressure as explained below moves the ring 24 to the right, Figures 2 and 3, a portion of the ring's sidewall 29 at one end will be supported against further rightward movement by the juxtaposed sidewall of the groove 26, but the sidewall 29 at the other end of the ring 24 will be spaced from the latter sidewall of groove 26 by an amount of clearance 30, Figure 2. As wear takes place between the ring 24 and the inner wall of cylinder 11, the ring 24 will gradually expand and reduce the clearance 30. As long as a slight clearance 30 remains, the seal will continue to be effective as described below.

During fluid operation of piston 12 urging the latter to the right, hydraulic fluid is introduced under pressure into chamber 13 and is exhausted from chamber 14. The high pressure fluid entering chamber 13 flows into the clearance 31 between cylinder 11 and piston 12 and into the left side of groove 26, thereby to force rings 24 and 25 to the right as in Figure 3. The compressible ring 25 is also forced against the inner circumference of ring 24 and the right wall of groove 26 by the fluid pressure, thereby to effect an annular seal preventing leakage around the right side of ring 24 between the wall 29 and right sidewall of groove 25.

By virtue of the fluid pressure applied at the left edge of the ring 24, its tapered ends are forced into sealing engagement along the plane 27. The clearance 30 assures the aforesaid sealing engagement between the tapered ends while enabling relaxation of the dimensional tolerance for the unstressed diameter of ring 24, and is sufficiently small to prevent extrusion of the material of the rubber-like seal 25 thereinto. The clearance 30 is exaggerated in the drawings for the sake of illustration and is preferably less than .010" for high pressure seals.

When the pressure differential across the piston 12 is reversed, the rings 24 and 25 shift to the left as in Figure 4, but the sealing action is the same as above described. In each instance, the higher the pressure, the greater will be the force urging sealing engagement between the tapered ends of the ring 24 and accordingly the greater will be the sealing action.

In accordance with the present invention, it is not essential that the ring 25 be compressed against the bottom of groove 26, nor is it essential that the ring 25 cover the juncture between the abutting ends of the ring 24 along plane 27, as is required in similar types of piston ring seals. As illustrated in Figure 4, ring 25a of smaller cross sectional diameter than ring 25 is employed to engage the inner circumference of ring 24 yieldingly, but not the base of groove 26. Accordingly, the present invention also affords appreciable latitude in the dimensional tolerances of ring 25 or 25a. In the above regard, it is only important that the clearance between ring 25a and the bottom of groove 26 is sufficiently small with respect to the clearance 31 that high pressure fluid entering groove 26 from either chamber 13 or 14 will force the rings 24 and 25 against the low pressure side of groove 26 to effect the aforesaid sealing action.

In order to assure adequate sealing pressure between the outer periphery of the ring 24 and the cylinder 11, while rendering feasible the use of an inner ring comparable to the ring 25 or 25a of comparatively soft compressible rubber-like material, another aspect of the present invention is to provide a resilient backing for the inner circumference of the rubber-like ring. Thus greater range is permitted in selection of the characteristics of the inner rubber-like ring so as to obtain optimum sealing qualities without regard to the ability of the inner ring to exert radially outward force against the outer ring 24.

In Figure 5, the cylinder 11, piston 12, outer split ring 24, and groove 26 are the same as above described. Instead of ring 25 or 25a, a resiliently deformable rubber-like inner ring 32 of generally rectangular cross section in its undeformed condition is employed. The ring 32 is forced radially outwardly against the ring 24, which in turn is forced radially outwardly into sealing engagement with cylinder 11, by the combined resiliency of ring 32 and a split backing ring 33, Figure 6, around the inner periphery of ring 32. Ring 33 is formed of comparatively hard resilient material, as for example spring steel, and has an outer diameter in its undeformed condition greater than the inner diameter of ring 32. Thus in the assembled position, Figure 5, ring 33 is under compression snugly against ring 32 urging the latter radially outward into engagement with ring 24. In all other respects, the fluid sealing operation of the assembly of Figure 5 during operation of piston 12 is the same as above described. The fluid pressure at the high pressure side of groove 26, the right side in Figure 5, urges the ring 32 into sealing engagement with the low pressure side of groove 26 and with the inner periphery of ring 24 to effect a fluid seal between the low pressure side of the latter and groove 26. Also as above stated, the fluid pressure at the high pressure side of groove 26 forces the tapered ends of ring 24 together into fluid sealing engagement with each other.

Figures 7 and 8 show a structure similar to that of Figures 5 and 6, wherein the split ring spring 33 is replaced by a coil garter-type spring 34 having a greater outer diameter in the unstressed condition than the inner diameter of ring 32. Thus spring 34 in the assembled condition is under radial compression and urges ring 32 radially outward as in Figure 5.

I claim:

1. In a fluid sealing structure between inner and outer cylindrical members, a split ring seated against the outer member, a second ring of deformable material seated within said split ring in sealing engagement therewith, means carried by at least one of said members for limiting axial displacement of said rings when a fluid pressure differential is applied thereacross, the opposite ends of said split ring being formed on a bias to abut each other in fluid sealing engagement along a cam plane oblique to the axis of said outer member, the bias formed abutting ends of said split ring being offset axially from each other such that said ends are urged together axially in mutual camming relationship and in fluid sealing engagement with each other by said pressure tending to enlarge the diameter of said split ring to urge the latter into sealing engagement with said outer member.

2. In a fluid sealing structure between inner and outer cylindrical members having a circumferential groove formed therebetween, a split ring within said groove and seated against said outer member, the opposite ends of said split ring being tapered and abutting along a cam plane oblique to the axis of said outer member and being offset from each other to provide a clearance between either sidewall of said groove and said spilt ring adjacent one of said tapered ends when the portion of said split ring adjacent its other tapered end is in abutment with said sidewall, the offset between said tapered ends being such that said ends are urged together axially by fluid pressure into fluid sealing and mutually camming engagement with each other tending to enlarge the diameter of said split ring to urge the latter into sealing engagement with said outer member when a fluid pressure differential is applied across said sealing structure, and a second ring of deformable material seated within said split ring in sealing relationship therewith.

3. In a fluid sealing structure between inner and outer cylindrical members, a split ring slidably seated against said outer member for relative movement with respect thereto in opposite directions parallel to the axis of the latter, the opposite ends of said ring being formed on a bias and abutting along a cam plane oblique to said axis, ring means yieldingly urging said split ring radially against said outer member including a second ring of deformable material seated against said split ring between the latter and said inner member, means carrier by at least one of said members for limiting axial displacement of said rings when a fluid pressure differential is applied thereacross, said bias formed abutting ends being offset axially from each other such that said ends are urged together axially into fluid sealing and mutually camming engagement with each other by said pressure differential tending to enlarge the diameter of said split ring to urge the latter into sealing engagement with said outer member, and said second ring being urged into fluid sealing engagement with said split ring and a portion of said inner member by said pressure differential to effect an annular fluid seal between said split ring and inner member.

4. In a fluid sealing structure between inner and outer cylindrical members, a split ring having a circumferential surface slidably seated against the outer member for relative movement with respect thereto in opposite directions parallel to the axis of the latter, said ring having parallel sides and having its opposite ends tapered, said opposite tapered ends abutting along a cam plane oblique to said axis and containing a radius of said outer member, ring means yieldingly urging said split ring radially against said outer member including a second ring of deformable raterial seated forcibly against said split ring between the latter and said inner member, means carried by at least one of said members for limiting axial displacement of said rings when a fluid pressure differential is applied thereacross, said opposite tapered ends being offset axially from each other such that said ends are urged together axially into fluid sealing and mutually camming engagement with each other by said pressure differential tending to enlarge the diameter of said split ring to urge the latter into sealing engagement with said outer member, and said second ring being urged into fluid sealing engagement with said split ring and a portion of said inner member by said pressure differential to effect an annular fluid seal between said split ring and inner member.

5. In a fluid sealing structure between inner and outer cylindrical members having a circumferential groove formed therebetween, a split ring within said groove and slidably seated against said outer member, the opposite ends of said split ring being tapered and abutting along a cam plane oblique to the central axis of said ring and being offset from each other to provide a clearance between either sidewall of said groove and said split ring adjacent one of said tapered ends when the portion of said split ring adjacent its other tapered end is in abutment with said sidewall, ring means yieldingly urging said split ring radially against said outer member including a second ring of deformable material seated against said split ring between the latter and inner member, the offset between said abutting tapered ends being such that said ends are urged together axially by fluid pressure into fluid sealing and mutually camming engagement with each other tending to enlarge the diameter of said split ring to urge the latter into sealing engagement with said outer member when a fluid pressure differential is applied across said sealing structure, and said second ring being urged into fluid sealing engagement with said split ring and the low pressure sidewall of said groove by said pressure differential to effect an annular fluid seal between said split ring and sidewall.

6. In a fluid sealing structure between inner and outer cylindrical members, a circumferential groove in said inner member, a split ring within said groove and slidably seated against said outer member for relative movement with respect thereto in directions parallel to its central axis, said split ring having parallel sides and its opposite ends being tapered and abutting along a cam plane oblique to said axis and containing a radius of one of said members, said opposite ends being offset from each other to provide a clearance between either sidewall of said groove and said split ring adjacent one of said tapered ends when the portion of said split ring adjacent its other tapered end is in abutment with said sidewall, ring means yieldingly urging said split ring radially against said outer member including a second ring of deformable material seated against said split ring between the latter and the inner member, the offset between said tapered abutting ends being such that said ends are urged together axially by fluid pressure into fluid sealing and mutually camming engagement with each other tending to enlarge the diameter of said split ring to urge the latter into sealing engagement with said outer member when a fluid pressure differential is applied across said sealing structure, and said second ring being urged into fluid sealing engagement with said split ring and the low pressure sidewall of said groove by said pressure differential to effect an annular fluid seal between said split ring and sidewall.

References Cited in the file of this patent
UNITED STATES PATENTS

| | | |
|---|---|---|
| 2,468,980 | Huber | May 3, 1949 |
| 2,876,052 | Burt | Mar. 3, 1959 |